(12) United States Patent
Zietsch

(10) Patent No.: US 6,572,089 B2
(45) Date of Patent: Jun. 3, 2003

(54) MOUNT FOR A SHOCK ABSORBER

(75) Inventor: Andreas Zietsch, Üchtelhausen (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/962,882

(22) Filed: Sep. 25, 2001

(65) Prior Publication Data

US 2002/0047231 A1 Apr. 25, 2002

(30) Foreign Application Priority Data

Oct. 19, 2000 (DE) .......................................... 100 51 769

(51) Int. Cl.[7] .................................................. F16F 9/00
(52) U.S. Cl. ................. 267/220; 267/195; 280/124.155
(58) Field of Search ................................ 267/220, 217, 267/219, 195; 280/124.145, 124.155, 124.147; 188/321.11

(56) References Cited

FOREIGN PATENT DOCUMENTS

| DE | 35 32 681 | | 9/1987 | |
|---|---|---|---|---|
| DE | 36 20 774 | | 5/1994 | |
| JP | 63-116916 A | * | 5/1988 | ................. 267/220 |
| JP | 2-104113 A | * | 8/1990 | ................. 267/220 |

* cited by examiner

Primary Examiner—Jack Lavinder
Assistant Examiner—Thomas J. Williams
(74) Attorney, Agent, or Firm—Cohen, Pontani, Lieberman & Pavane

(57) ABSTRACT

Mount for a shock absorber includes a cap in working torque-transmitting connection with the entire mount. The twisting surface, which is in working connection with an opposing surface on the vehicle at least during the installation of the shock absorber in a mounting hole in the vehicle. The twisting surface and the opposing surface ensure the rotational alignment of the connecting means on the mount side with the connecting means on the vehicle side.

12 Claims, 2 Drawing Sheets

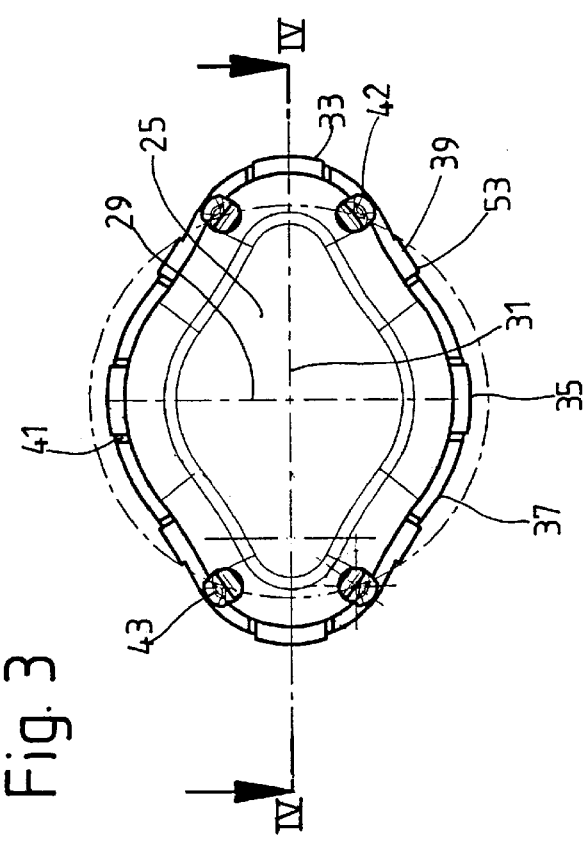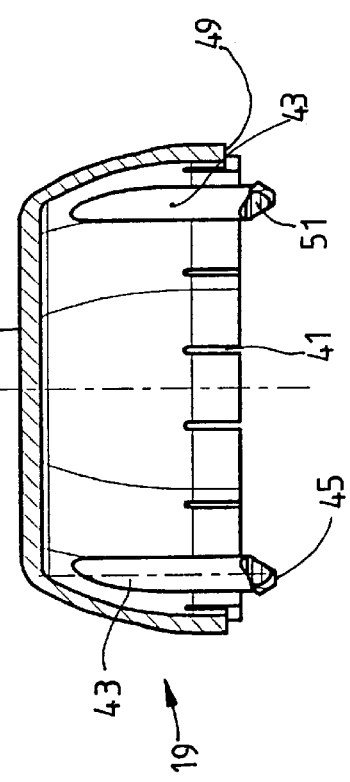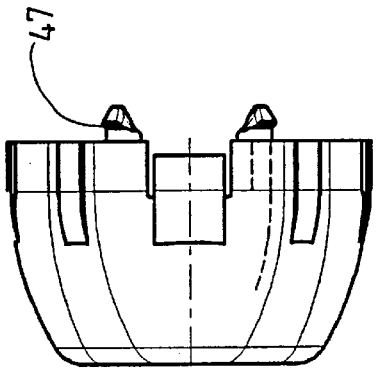

MOUNT FOR A SHOCK ABSORBER

BACKGROUND OF THE INVENTION

1. Field of the Invention

The invention pertains to a mount for a shock absorber, the mount having a twisting surface which engages an opposing surface on a vehicle at least during installation in a mounting hole of the vehicle, the twisting surface and the opposing surface ensuring the rotational alignment of the connecting means on the mount and the connecting means on the vehicle.

2. Description of the Related Art

IQ The increasing use of automation in vehicle assembly means that the individual parts of the vehicle must be designed in such a way that they can be assembled as easily as possible by machine. In regard to the installation of a shock absorber, for example, there is the problem that at least one connecting means on the shock absorber must be engaged with another connecting means on the body of the vehicle. When an assembly device introduces the shock absorber into the body, it can be assumed that the various connecting means in question will almost certainly not be properly aligned with each other. One way of solving this problem would be to make sure that the connecting means on the shock absorber is already in its defined installation position during the assembly process itself.

A mounting base is known from DE 35 32 681, which has a specially de- signed rubber-metal mount with twisting surfaces. The twisting surfaces in conjunction with corresponding opposing surfaces on the vehicle ensure that the connecting means are automatically aligned with each other during the assembly motions. A significant disadvantage of this rubber-metal mount is that, although the shape of the rubber-metal mount may well be suitable for automated assembly, it suffers otherwise from functional disadvantages in certain situations.

DE 36 20 774 describes a mount for a shock absorber located on the body of the vehicle, where a cap on the mount is connected to the shock absorber. During assembly, the cap is introduced into an opening in the body and latches itself, in the axial direction only, with the specially designed edge area of the opening. Additional screws are used to secure it permanently in place. To release the latching connection, the cap can be twisted in the circumferential direction independently of the part of the mount which is screwed to the body.

SUMMARY OF THE INVENTION

The object of the present invention is to realize a mount for a shock absorber which guarantees that the connecting means used to connect the shock absorber to the vehicle are automatically aligned.

This object is accomplished in accordance with the invention by providing the mount with a cap having at least one twisting surface, the cap being in working, torque-transmitting connection with the entire mount.

An essential advantage of the invention is that only the cap needs to be designed to meet the requirements of the automated installation of the shock absorber. Any spring elements or other components of the mount can be designed specifically to fulfill their intended function.

It is also provided that the working, torque-transmitting connection is formed by at least one extension on the cap, which engages with the mount. This working, positive-locking connection ensures that the various connecting means are positioned with a high degree of positional accuracy with respect to each other. In addition, higher torques can be transmitted.

According to an advantageous embodiment, the extension has latching means, which form a latching connection with the mount. As a result, the cap can be disconnected from the mount very quickly.

The cap consists preferably of plastic and does not need to absorb any axial bearing forces. To minimize the amount of space required for the latching connection, the extension has an area of reduced cross-section, which allows the latching means to move elastically during the assembly process.

The cap has at least one stiffening rib to provide the greatest possible strength at the lowest possible weight.

To arrive at a simple overall shape and especially to arrive at a shape which allows the cap to be injection-molded in the most efficient manner possible, the extension represents a continuation of the stiffening rib.

So that the assembly motion can compensate for the largest possible angle of twist error, the cap has an elliptical base surface. The ends of the major and minor axes of the base surface are terminated by radii, and transition radii which curve radially inward extend between the terminal radii.

So that the cap can transmit torque from the twisting surface to the mount during the assembly motion over the shortest possible path of force transmission, the stiffening ribs are located near the terminal radii of the cap.

It may happen that the shock absorber connected to the mount reaches its wear limit and must be replaced. So that the mount does not have to be discarded also, the cap has a disconnect opening to allow the insertion of a tool, which can be used to disconnect the minimum of one extension from the mount. After the cap has been removed, the mount can be disconnected from the shock absorber.

So that the connecting means can be positioned as precisely as possible, the cross-sectional surface of the cap is longer in one direction with respect to the intended final assembly position than the mounting hole. The cap fits into the mounting hole with at least a transition fit, if not a press fit.

At least a small amount of deformation of the cap is associated with a press fit between the cap and the mounting hole. To avoid stress peaks within the cap and to allow the desired deformation, the walls of the cap have slots, which form the boundaries of wall parts with radial elasticity, which are in working connection with the mounting opening.

In another advantageous embodiment, the elastic wall parts represent the twisting surfaces of the cap.

The increased load on the cap in the area of the elastic wall parts is taken into account by making the elastic wall parts thicker, at least over part of their area, than the adjacent wall areas.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a top view of the cap;

FIG. 4 shows a cross-section of the cap; and

FIG. 5 shows a side view of the cap.

DETAILED DESCRIPTION OF THE PRESENTLY PREFERRED EMBODIMENTS

Figure 1:
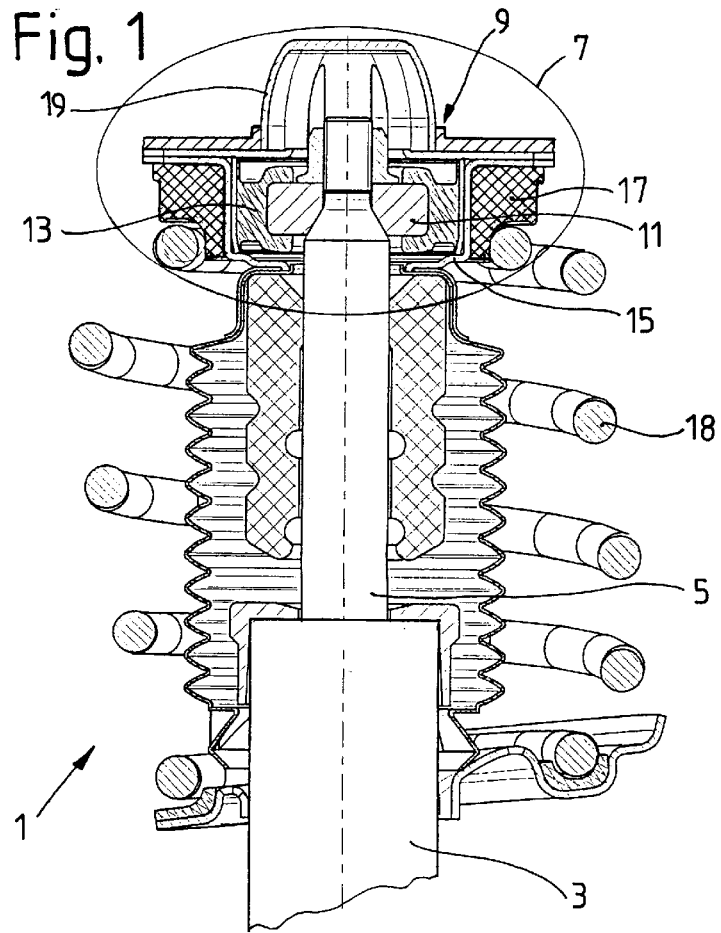
FIG. 1 shows the top end of a shock absorber with a cap.

FIG. 1 shows the top end of a shock absorber 1, which comprises a cylinder 3, in which a piston rod 5 is supported with freedom of axial movement. At its outer end, the piston rod has a mount 7, by which it is connected to a vehicle, of which only a mounting hole 9 inside a support element is shown. A mounting hole of this type can be provided in, for example, an inside fender of the vehicle.

The mount 7 comprises a support 11, which is at least partially surrounded by a spring element 13. The spring element is enclosed in turn by a mount housing 15, against the outside of which a spring pad 17 for a vehicle suspension spring 18 is supported. The entire mount is covered by a cap 19.

Figure 2:
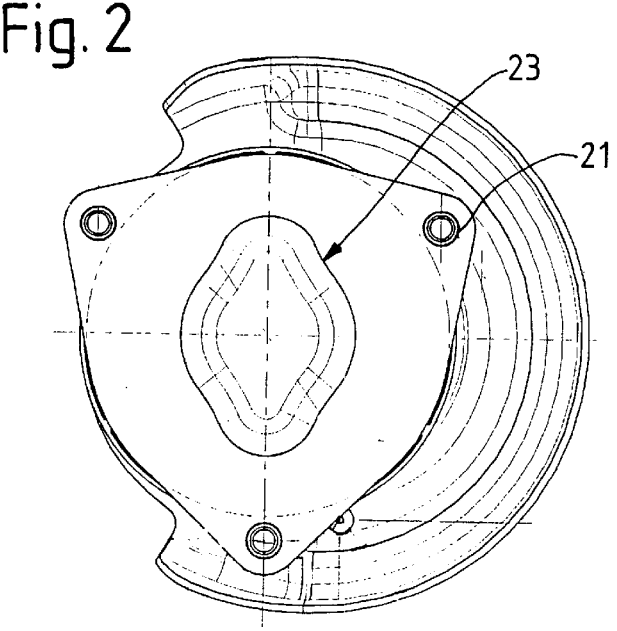
FIG. 2 shows a top view of the mount with the shock absorber.

FIG. 2 shows a top view of the mount 7. The mount housing 15 contains connecting means 21 in the form of holes for fastening screws for attachment to the vehicle. During the assembly process, these holes must be brought into alignment with connecting means on the vehicle (not shown). For this purpose, the cap 19 is connected to the mount housing 15 in such a way that torque can be transmitted effectively from one to the other; the cap also has several twisting surfaces 23.

FIGS. 3, 4, and 5 show the cap 19 as an isolated part. As can be derived from FIG. 3, the cap has a substantially elliptical base surface 25 and tapers conically toward the top 27 of the cap. At the ends of the major axis 31 and minor axis 29 of the elliptical base surface, the walls of the cap are terminated by radii 33; 35. The mounting hole 9 (see FIG. 1) has a complementary substantially elliptical profile, and the cap works together with the mounting hole to form at least a transition fit or a press fit. For this purpose, the cross-sectional area of the cap extends farther in at least one direction than the mounting hole in the vehicle with respect to the intended final assembly position of the shock absorber in the vehicle. Between the terminal radii 33; 35 are radially inward curving transition radii 37; 39. The terminal radii and the transition radii form the twisting surfaces of the cap.

Slots 41 in the walls of the cap form the boundaries of radially elastic wall parts 42 in the cap, so that the cap can fit with as little play as possible in the mounting hole. These radially elastic wall parts represent at least a portion of the twisting surfaces of the cap.

As can be seen especially clearly in FIGS. 3 and 4, the cap has a total of four stiffening ribs 43, which are located near the terminal radii 33. The stiffening ribs have extensions 45, which engage in holes in the mount housing 15 (FIG. 1). Latching detents 47, which form a latching connection with the mount housing, are provided on the extensions 45, as can be seen in FIG. 5.

These extensions 45 form the previously described torque-transmitting connection with the mount housing.

So that the cap can be easily removed from the mount housing, the cap has a disconnect opening 49, into which a tool can be introduced to release the latching detents 47. The extensions have an area of reduced cross-section 51 to improve the elastic deformation of the extensions and to make it easier to release them from the latching connection with the mount housing.

To install the shock absorber in the vehicle, the shock absorber is introduced together with the mount, including the cap, into the mounting hole 9 in the vehicle. The conical form of the cap and the twisting surfaces of the cap, at least certain partial areas 53 of which are thicker than the adjacent areas, cause the entire mount to rotate as the shock absorber is being inserted axially into the mounting hole, thus bringing the connecting means 21 of the mount into alignment with the connecting means on the vehicle.

The cap used makes it possible not only to design the mount in optimal fashion while ensuring that the spring element is properly aligned within the mount but also to protect the piston rod attachment from corrosion.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A mount for mounting a shock absorber to a mounting surface in a vehicle, said mounting surface having a mounting hole and connecting means for connecting to said mount, said mount comprising a mount housing having connecting means for connecting to said vehicle, and a cap in torque transmitting connection with said mount housing, said cap being profiled for reception in said mounting hole so that said connecting means of said mount housing is rotationally aligned with said connecting means of said vehicle during insertion of said cap into said mounting hole, said cap having a substantially elliptical base surface in working connection with an opposing surface of the vehicle, said base surface having a major axis ending at terminal radii, a minor axis ending at terminal radii, and radially inward curving transition radii between said terminal radii.

2. A mount as in claim 1 wherein said cap comprises at least one extension which engages in said mount housing to form said torque transmitting connection.

3. A mount as in claim 2 wherein said extension comprises a detent which forms a latching connection with said mount housing.

4. A mount as in claim 3 wherein said extension has an area of reduced cross-section which allows elastic movement of the detent during installation.

5. A mount as in claim 2 wherein said cap comprises at least one stiffening rib, said extension being formed as a continuation of said stiffening rib.

6. A mount as in claim 1 wherein said cap comprises at least one stiffening rib.

7. A mount as in claim 1 wherein said cap comprises at least one stiffening rib located in at least one of the terminal radii.

8. A mount as in claim 3 wherein said cap comprises an opening for receiving a tool to release said extension from said mount housing.

9. A mount as in claim 1 wherein said cap is longer in at least one direction, with respect to its final mounting position, than the mounting hole.

10. A mount as in claim 1 wherein said cap has a lateral wall comprising wall parts separated by slots, said wall parts having radial elasticity for loading against said mounting hole.

11. A mount as in claim 10 wherein said wall parts form said twisting surfaces of said cap.

12. A mount as in claim wherein said wall parts have areas which are thicker than adjacent parts of the lateral wall.

* * * * *